(12) United States Patent
Zortea et al.

(10) Patent No.: US 7,916,671 B1
(45) Date of Patent: Mar. 29, 2011

(54) ECHO CANCELLATION FOR DUPLEX RADIOS

(75) Inventors: Anthony Eugene Zortea, Pipersville, PA (US); Matthew McAdam, Vancouver (CA)

(73) Assignee: PMC-Sierra, Inc., Santa Clara, CA (US)

( * ) Notice: Subject to any disclaimer, the term of this patent is extended or adjusted under 35 U.S.C. 154(b) by 69 days.

(21) Appl. No.: 12/504,295

(22) Filed: Jul. 16, 2009

(51) Int. Cl.
*H04J 13/00* (2006.01)
(52) U.S. Cl. ........................................ 370/286
(58) Field of Classification Search .................. 370/286, 370/288, 290
See application file for complete search history.

(56) References Cited

U.S. PATENT DOCUMENTS

| | | | |
|---|---|---|---|
| 4,490,682 | A | 12/1984 | Poulo |
| 6,753,727 | B2 | 6/2004 | Magoon et al. |
| 6,897,700 | B1 | 5/2005 | Fu et al. |
| 7,035,400 | B1 * | 4/2006 | Gaikwad et al. ............. 379/417 |
| 7,132,861 | B1 | 11/2006 | Fu et al. |
| 2005/0084003 | A1 | 4/2005 | Duron et al. |
| 2008/0009257 | A1 | 1/2008 | Safarian et al. |
| 2008/0009258 | A1 | 1/2008 | Safarian et al. |
| 2008/0242245 | A1 | 10/2008 | Aparin |

OTHER PUBLICATIONS

Zortea, et al; Run-Length Based Spectral Analysis; Specification and drawings of related U.S. Appl. No. 12/055,948; filed Mar. 26, 2008.

Zortea, et al; Integrated Tunable RF Notch Filter; Specification and drawings of related U.S. Appl. No. 12/349,328; filed Jan. 6, 2009.

Safarian, et al; Integrated Blocker Filtering RF Front Ends; Radio Frequency Integrated Circuits (RFIC) Symposium; Jun. 3-5, 2007; pp. 13-16; 2007 Institute of Electrical and Electronics Engineers (IEEE).

Chi, et al.; A Superheterodyne Receiver Front-End with On-Chip Automatially Q-Tuned Notch Filters; Publication of 2007 IEEE Radio Frequency Integrated Circuits Symposium; pp. 21-24.

Tenbroek, et al.; Single-Chip Tri-Band WCDMA/HSDPA Transceiver without External SAW Filters and with Integrated TX Power Control; Publication of 2008 IEEE International Solid-State Circuits Conference; pp. 202-203, 607.

Mirzaei, et al.; A Low-Power WCDMA Transmitter with an Integrated Notch Filter; IEEE Journal of Solid-State Circuits; vol. 43; No. 12; Dec. 2008; pp. 2868-2881.

Vladimir Aparin; A New Method of TX Leakage Cancelation in W/CDMA and GPS Receivers; 2008 IEEE Radio Frequency Integrated Circuits Symposium; pp. 87-90.

* cited by examiner

*Primary Examiner* — Melvin Marcelo
(74) *Attorney, Agent, or Firm* — Knobbe Martens Olson & Bear LLP

(57) ABSTRACT

In a Frequency Duplex Division (FDD) radio, the transmit and receive signals are separated by frequency. In a wireless application, the power of the transmitted signal is typically much larger than the power of the received signal. A duplexer is used to separate the transmit and receive signals. Despite the operation of the duplexer, a residual transmit signal, or echo, can be present at the receiver input as a result of finite attenuation in the duplexer and other sources of transmit to receive crosstalk. With a relatively linear low-noise amplifier (LNA) and output limited mixer linearity, the echo can be cancelled in analog baseband directly at the mixer output using an out-of-channel signal indicator as the error signal for an echo control loop.

22 Claims, 16 Drawing Sheets

ECHO CANCELLATION FOR DUPLEX RADIOS

CROSS-REFERENCE TO RELATED APPLICATIONS

This application is related to commonly-owned copending application titled RUN-LENGTH BASED SPECTRAL ANALYSIS, Ser. No. 12/055,948, filed on Mar. 26, 2008 by Zortea and McAdam; and commonly-owned copending application titled POWER OPTIMIZED ADC FOR WIRELESS TRANSCEIVERS, Ser. No. 12/114,322, filed May 2, 2008, by Zortea, which issued as U.S. Pat. No. 7,760,122 on Jul. 20, 2010, the disclosures of which are hereby incorporated by reference in their entireties herein.

BACKGROUND

1. Field of the Invention

The invention generally relates to electronics, and in particular, to frequency division duplex radios.

2. Description of the Related Art

Echo cancellation is a well-known technique in transceiver design. The application of echo cancellation within the RF domain is less well known.

In a frequency division duplexing (FDD) radio, the channels for transmission and reception are separated by a difference in carrier frequency. FIG. 1 illustrates a frequency spectrum with an Uplink and a Downlink, or Tx and Rx, respectively, which can beneficially be transmitted simultaneously (full duplex). Frequency division duplexing is used in both wired and wireless systems. For example, FDD is found in DSL modems, cell phone systems, IEEE 802.16 WiMax systems, and the like.

In a wireless system, when two transceivers in a communications link are spaced far apart, the transmitted (Tx) signal of a transceiver will have much more power than the received (Rx) signal at the antenna, as illustrated by FIG. 2 (not to scale).

Moreover, in a typical wireless system, the transmitter and the receiver of a transceiver share a common antenna. To share the antenna, a duplexer is introduced into the transceiver front end to attenuate the transmit signal (seen at the input of the Rx), as shown in FIGS. 3 and 4.

Typical duplexers offer about 50 dB of attenuation to the Tx signal. This means that the residual Tx signal or echo signal (seen at the Rx (or LNA) input) can still be quite large at the input to the LNA.

To tolerate this relatively large echo signal, the linearity, expressed as intercept points IP2 and IP3 of the LNA, mixer, and analog baseband should be increased. An increase in the linearity of a wireless transceiver results in increases in size, power, and cost.

DSP-based echo cancellation is a well known technique for wired transceiver design, such as, for example, with Gigabit Ethernet over copper. However, DSP echo cancellation methods are inapplicable to a wireless transceiver because the nonlinearity of the analog amplifiers would have already introduced distortion into the received signal before the echo is canceled by the DSP in the digital domain.

For examples of the conventional art, see V. Aparin, "A New Method of TX Leakage Cancellation in W/CDMA and GPS Receivers", 2008 RFIC Symposium, RM01D-4. Also refer to U.S. Patent Application Publication No. 2005/0084003 by Duron.

Co-existence of wireless communication links from different wireless standards, and a generally crowded wireless spectrum results in "interfering" radio signals near the frequency of a desired radio signal to be received, as illustrated in FIG. 16.

In an extreme case, the presence of a relatively large interferer near the desired signal makes reception of the desired signal impossible. Even in a relatively good case, the ability to handle a relatively large interferer increases the linearity and baseband filtering requirements of the radio, which in turn increases the radio's cost and power.

One conventional solution to the problem of a large interferer is to increase the linearity and increase the analog baseband requirements of the radio front end. This approach increases both the cost and the power used by the radio.

In another approach illustrated in FIG. 17, the interfering signal is separated at baseband, then up-converted to RF and subtracted from the total RF signal. See Aminghasem Safarian, et al., Integrated Blocker Filtering RF Front Ends, Radio Frequency Integrated Circuits (RFIC) Symposium, Jun. 3-5, 2007, 2007 Institute of Electrical and Electronics Engineers (IEEE), pp. 13-16.

SUMMARY OF THE DISCLOSURE

In a Frequency Duplex Division (FDD) radio, the transmit and receive signals are separated by frequency. In a wireless application, the power of the transmitted signal is typically much larger than the power of the received signal. A duplexer is used to separate the transmit and receive signals. Despite the operation of the duplexer, a residual transmit signal, or echo, can be present at the receiver input as a result of finite attenuation in the duplexer and other sources of transmit to receive crosstalk. With a relatively linear low-noise amplifier (LNA) and output limited mixer linearity, the echo can be canceled in analog baseband directly at the mixer output using an out-of-channel signal indicator as the error signal for an echo control loop.

Desirably, for echo cancellation in an RF wireless transceiver, the transceiver (1) avoids a summation in RF of the echo cancellation signal and the original input signal; (2) generates an error signal to be used in a control loop to control the echo cancellation; and (3) generates a properly sized (magnitude) and delayed (phase) copy of the Tx signal to be used to cancel the echo. To cancel the echo, one embodiment (1) performs the summation (echo cancelation) at the output of the mixer, where most of the nonlinearity occurs; (2) generates the error signal for control with the out-of-channel (OOC) indicator described in commonly-owned copending application titled RUN-LENGTH BASED SPECTRAL ANALYSIS, Ser. No. 12/055,948, filed on Mar. 26, 2008 by Zortea and McAdam, the disclosure of which is hereby incorporated by reference in its entirety herein; and (3) generates the echo copy with a local oscillator (LO) mixing scheme.

BRIEF DESCRIPTION OF THE DRAWINGS

These drawings and the associated description herein are provided to illustrate specific embodiments of the invention and are not intended to be limiting.

DETAILED DESCRIPTION OF SPECIFIC EMBODIMENTS

Although particular embodiments are described herein, other embodiments of the invention, including embodiments that do not provide all of the benefits and features set forth herein, will be apparent to those of ordinary skill in the art.

While embodiments of the transceiver are illustrated in the context of quadrature amplitude modulation (QAM), the principles and advantages of the echo cancellation techniques disclosed herein are applicable to other configurations of transceivers. In a QAM system, a carrier frequency at $f_0$ is modulated by both an in-phase baseband I(t) and a quadrature-phase baseband signal Q(t) to generate an RF signal s(t) (see Eq. 1A), which is then amplified and transmitted. The RF signal s(t) is subsequently received and demodulated.

$$s(t)=I(t)\cos(2\pi f_0 t)+Q(t)\sin(2\pi f_0 t) \quad \text{(Eq. 1A)}$$

In a transceiver using frequency division duplexing, the carrier frequencies for transmitting and for receiving are at different center frequencies to separate the transmit waveform from the receive waveform. However, components such as duplexers do not function perfectly, and the transmit waveform leaks onto the receive waveform.

Figure 1:
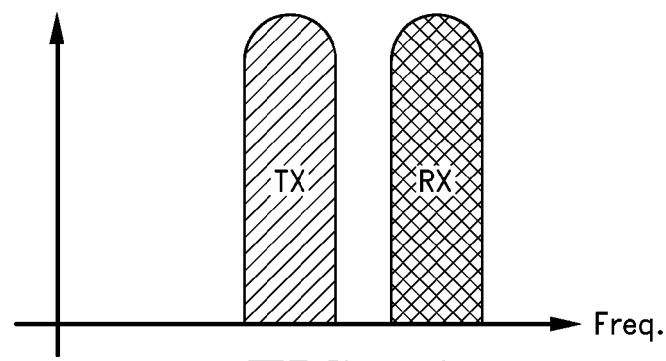
FIG. 1 illustrates frequency division duplexing (FDD).
Figure 2:
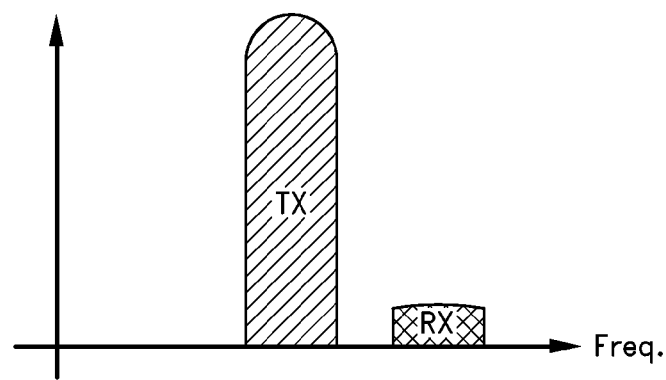
FIG. 2 illustrates a typical relative magnitude of a transmit signal versus a receive signal for FDD.
Figure 3:
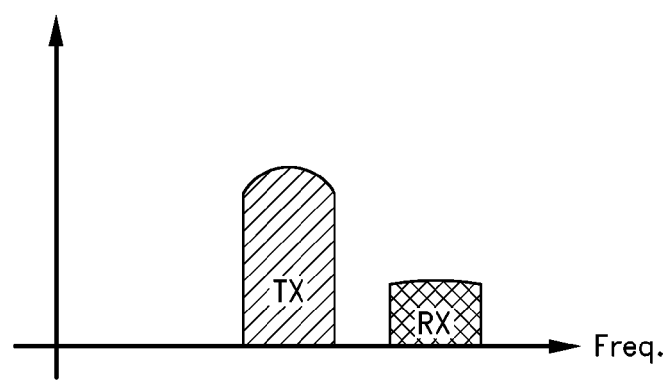
FIG. 3 illustrates a typical relative magnitude of a transmit signal versus a receive signal (at the input of the Rx) for FDD with a duplexer.
Figure 4:
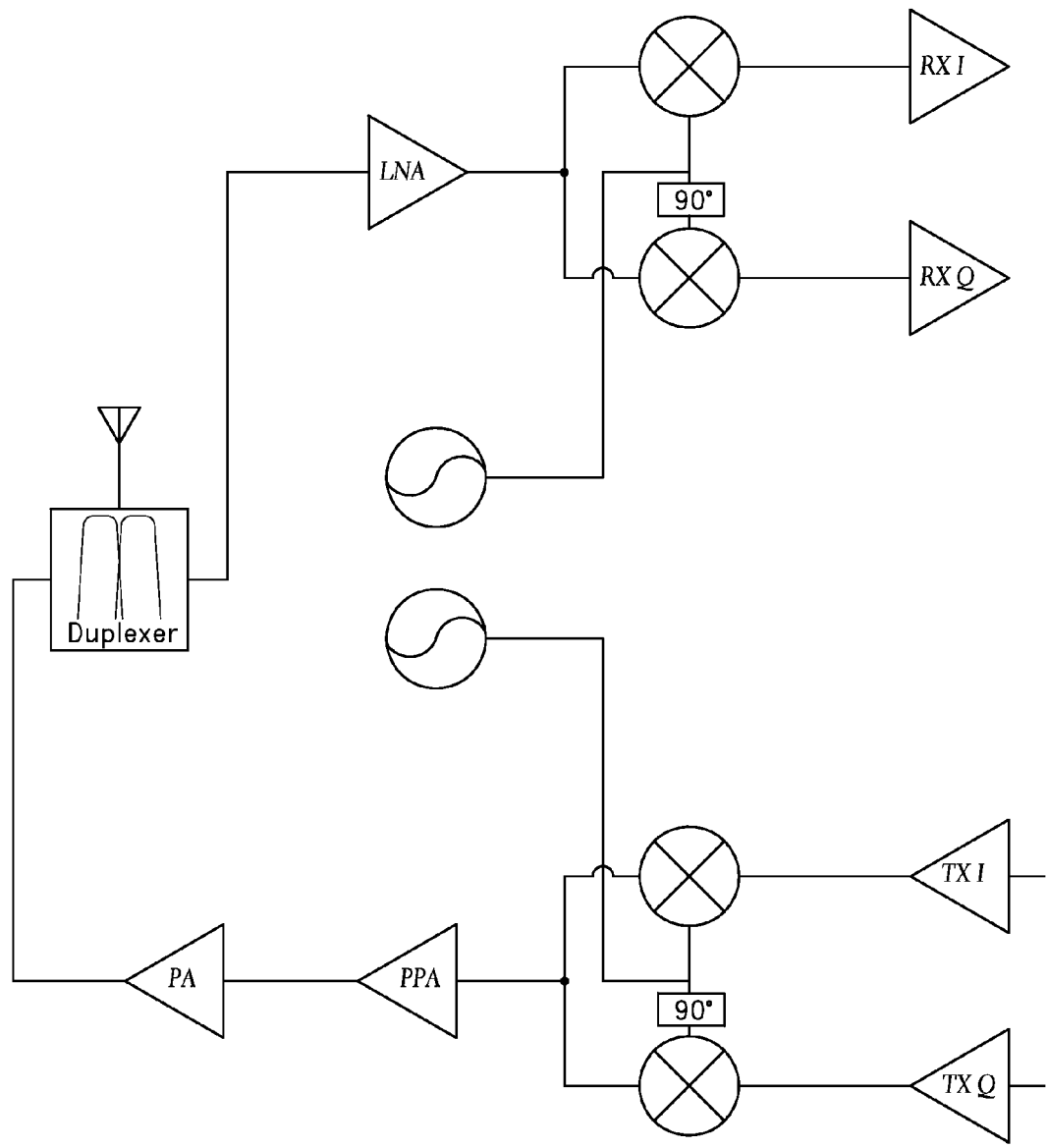
FIG. 4 illustrates an example of a conventional FDD transceiver with a duplexer.
Figure 5:
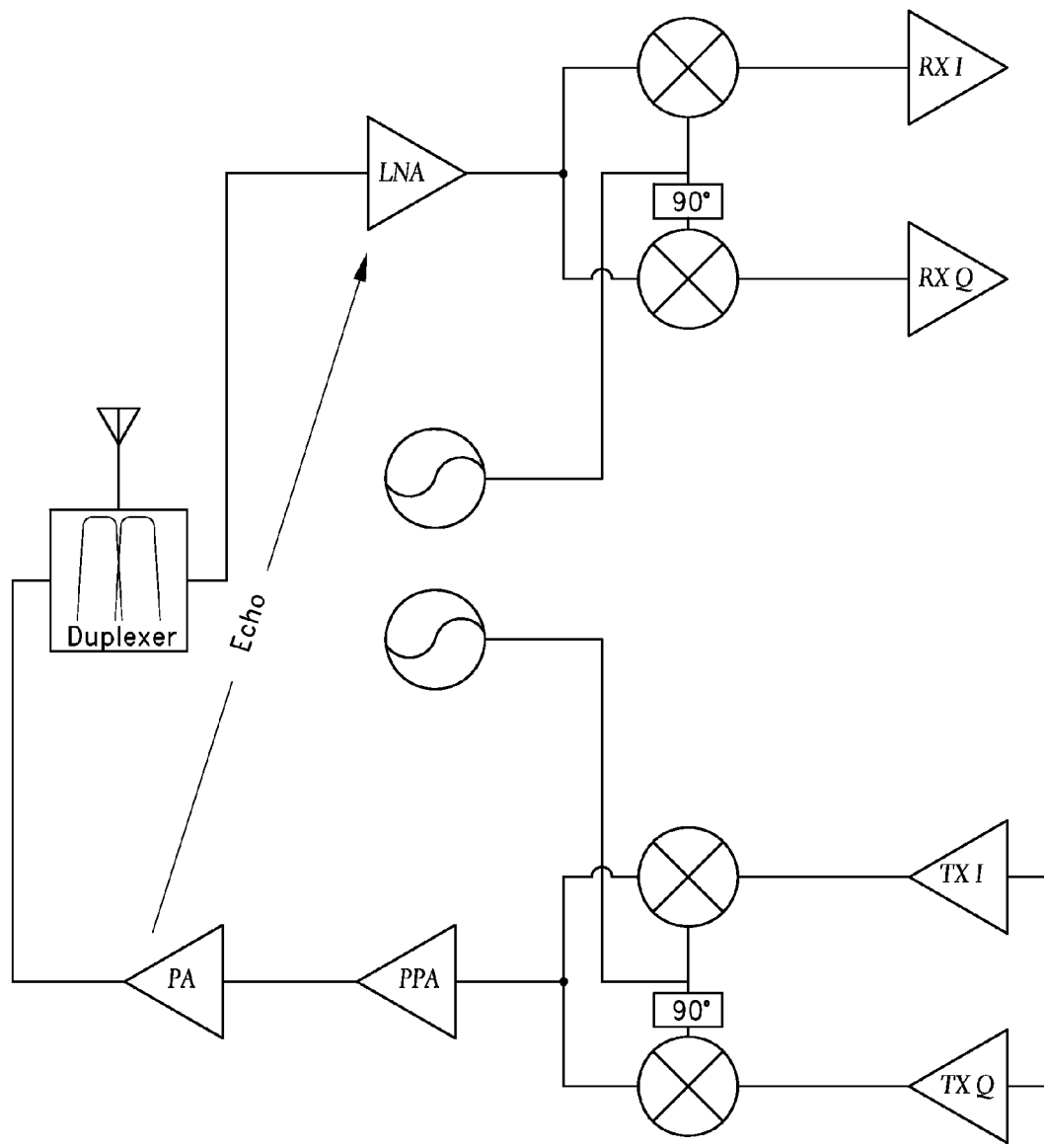
FIG. 5 illustrates the echo path for the conventional FDD transceiver.
Figure 6:
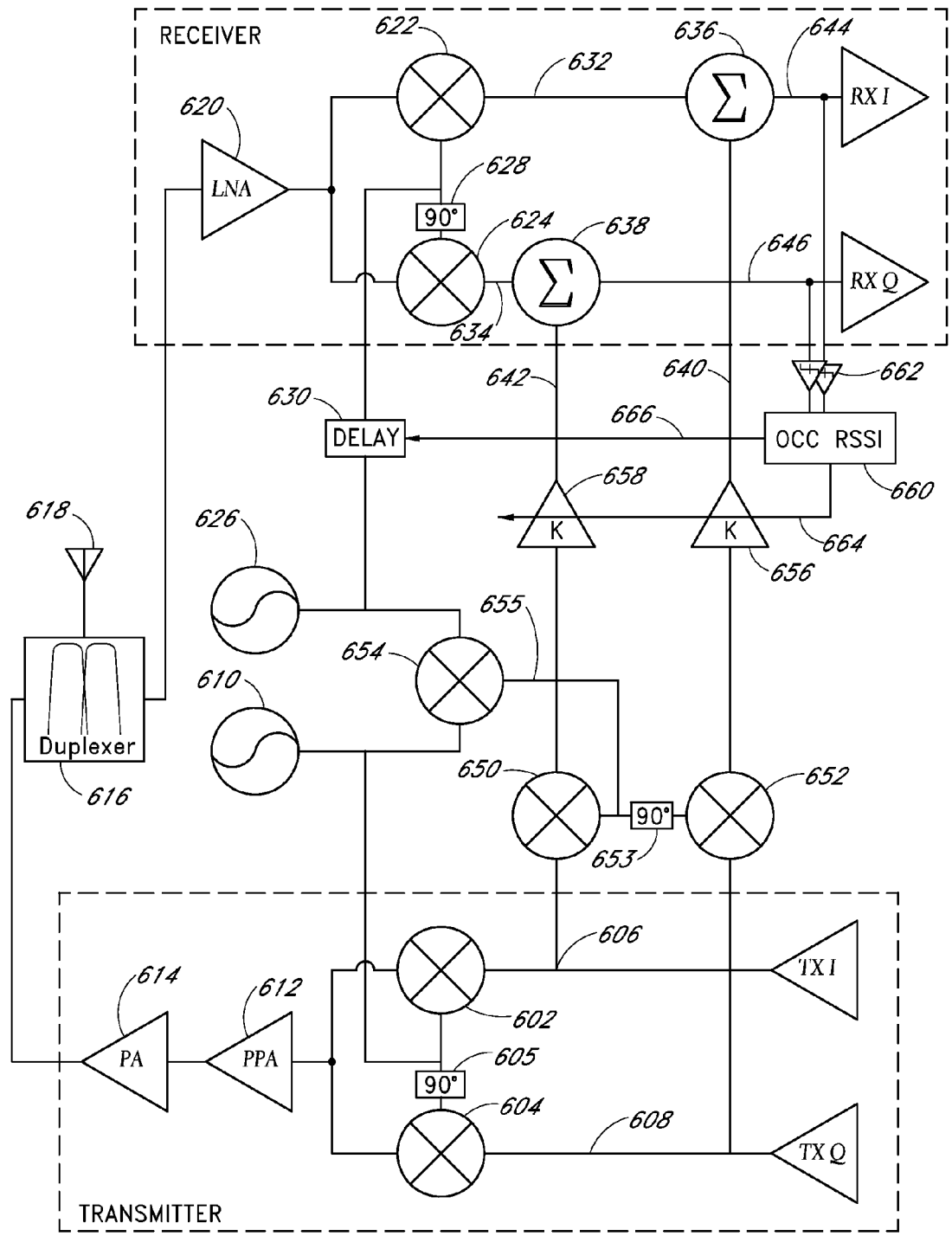
FIG. 6 illustrates a transceiver with echo cancellation according to an embodiment of the invention.
Figure 14:
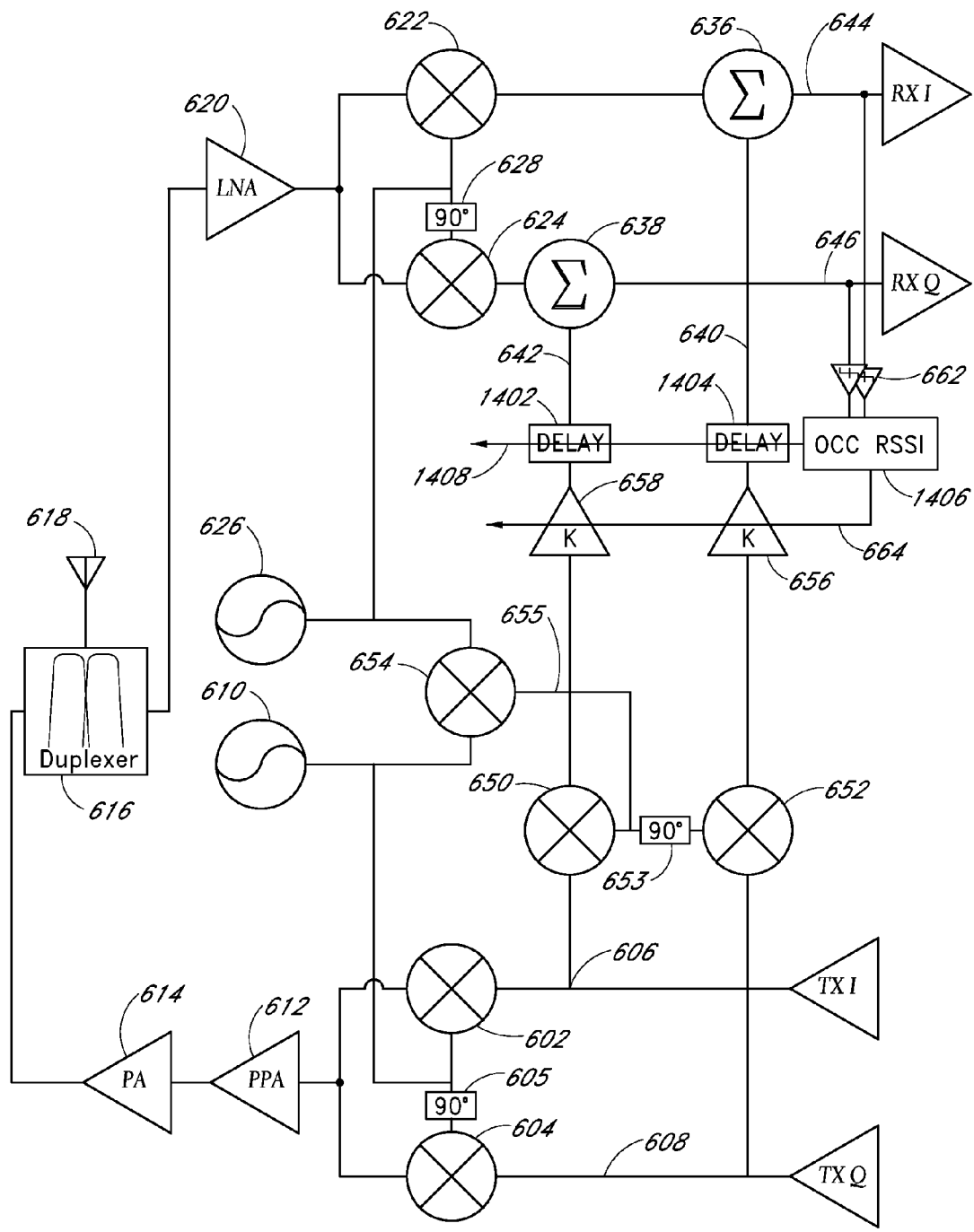
FIG. 14 illustrates a transceiver with echo cancellation according to an alternative embodiment.
Figure 15:
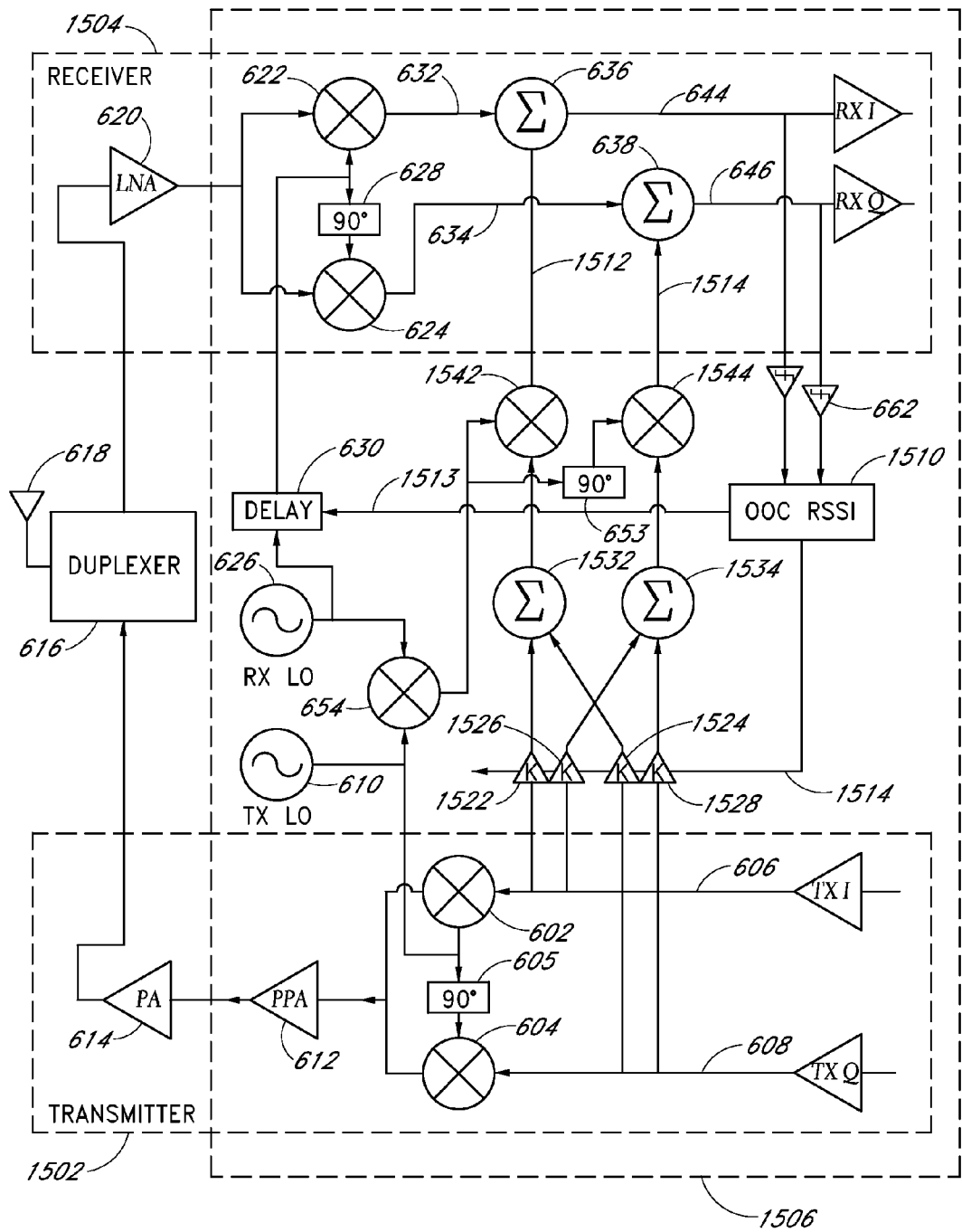
FIG. 15 illustrates a transceiver with echo cancellation according to an alternative embodiment.

FIG. 6 illustrates a transceiver with echo cancellation according to an embodiment of the invention. FIG. 14 illustrates an alternative embodiment with adjustable delays in a different path. FIG. 15 illustrates an embodiment with cross-coupling, which provides more complete echo cancellation. The embodiment of FIG. 15 provides echo cancellation of the leakage from both I(t) and Q(t) transmit baseband signals (transmitter baseband I and Q signals) 606, 608 to both I(t) and Q(t) receive baseband signals 644, 646. The embodiments illustrated in FIGS. 6 and 14 provide partial echo cancellation, such as cancellation of the I(t) transmit baseband channel 606 to one of the I(t) or Q(t) receive baseband signal 644, 646, and the cancellation of leakage from the Q(t) transmit baseband channel 608 to one of the Q(t) or I(t) receive baseband signal 646, 644. In the illustrated embodiments of FIGS. 6 and 14, the echo from the transmitter side I(t) 606 and Q(t) 608 is canceled from receiver-side Q(t) 646 and I(t) 644, respectfully, but the reverse can alternatively be performed. In the embodiment of FIG. 15, the echo from both the transmitter-side I(t) and Q(t) baseband signals 606, 608 is canceled from both the receiver-side I(t) and Q(t) baseband signals 644, 646. The combination of 1522, 1524, 1526, 1528, 1532, and 1534 is a technique to generate a "phase-rotated" version of the complex baseband signal I(t)+j Q(t).

The baseband I and Q signals 606, 608 are mixed (upconverting) 602, 604 with an I and Q phase of a transmit (Tx) local oscillator (LO) 610, respectively, and summed to generate the transmit waveform. A 90 degree phase shifter 605 generates the Q phase of the Tx LO 610 from the I phase. The 90 degree phase shifter 605 can also be considered to be a part of the Tx LO 610, and is typically generated via a PLL or a filter. The transmit waveform is then provided as an input to a pre-power amplifier (PPA) 612, which provides amplification for a power amplifier (PA) 614. The transmit waveform is then amplified by the power amplifier (PA) 614. In one embodiment, the pre-power amplifier (PPA) 612 is part of an integrated circuit, and the power amplifier (PA) 614 is off chip.

The amplified transmit signal is provided as an input to a duplexer 616, and is then transmitted out via an antenna 618. The same antenna 618 is used to transmit and to receive signals. The duplexer 616 and the antenna 618 are typically off chip. The duplexer 616 isolates the transmit (Tx) and the receive (Rx) signals. In the illustrated embodiment, the duplexer isolates the transmit (Tx) and the receive (Rx) signals by notch filtering, but other types of duplexers can be used. Regardless, duplexers do not function perfectly, and some of the transmitted signal is inevitably leaked to the receive path.

A received signal takes a path from the antenna 618, to the duplexer 616, and then to the low-noise amplifier (LNA) 620. In one embodiment, the LNA 620 is off chip. Mixers 622, 624 downconvert the received signal by mixing the received signal with an I and Q phase oscillator signal. Low-pass filtering or band pass filtering can be performed after downconversion and is not shown in FIG. 6. In the illustrated embodiment, a receiver local oscillator 626 generates only the I phase, and a 90 degree phase shifter 628 generates the Q phase from the I phase by delaying the Q phase relative to the I phase for a time corresponding to 90 degrees. An adjustable delay circuit 630 is disposed in the local oscillator signal path between the LO 626 and the mixers 622, 624. As will be explained in greater detail later, the adjustable delay circuit 630 is adjusted to align the received signals with the echo copy for relatively good cancelation. In an alternative the phase shift (relative 90 degrees) can be performed upstream of the adjustable delay circuit 630, and the adjustable delay circuit 630 can be operative on both I and Q phases. In yet another alternative embodiment, the echo copy itself can be adjusted for delay as will be described later in connection with FIG. 14.

Echo is canceled in analog baseband at the receiver I and Q baseband signals 632, 634 by summing 636, 638 the same with the echo copy 640, 642. The echo copy 640, 642 is out-of-phase (inverted) with respect to the leakage echo and scaled so that when combined with the receiver I and Q baseband signals 632, 634, the echo copy 640, 642 destructively interferes with the echo, and the echo content within the modified I and Q baseband signals 644, 646 is reduced. This reduces the linearity requirements of the baseband circuits and thus, reduces the size, power, and cost of the receiver portion of the transceiver.

The echo copy 640, 642 is generated from the baseband signals 606, 608. To generate the echo copy, the baseband signals 606, 608 are mixed 650, 652 with a separation signal 655 having a frequency $f_{separation}$ and adjusted for gain 656, 658. The separation frequency $f_{separation}$ corresponds to the difference in frequency between the receiver local oscillator 626 frequency and the transmitter local oscillator 610 frequency as illustrated in further detail in FIG. 12. In the illustrated embodiment, the LO 626 for the receiver has a higher frequency than the LO 610 for the transmitter, but the reverse is also applicable.

The separation signal 655 with frequency $f_{separation}$ is generated by mixing 654 the oscillator signals from the transmitter local oscillator (LO) 610 and the receiver local oscillator (LO) 626. In addition, low-pass or band-pass filtering can be performed after the separation mixing 654 and is not shown in FIG. 6. The separation mixing 654 accounts for the difference and subsequent mixing 650, 652 account for the difference in frequency between the transmitter and receiver local oscillators 610, 626. The separation signal 655 also has an I-phase and a Q-phase, and the Q-phase can be generated from the I-phase via a 90 degree phase shifter 653. The phase shifter 653 can be integrated with the mixer 654 such that a mixer circuit provides multiple phases of the separation signal 655. The phase shifter 653 can be implemented by, for example, a phase locked loop (PLL), a filter, or the like. The frequency for the 90 degree phase shifter 653 is that of the separation frequency $f_{separation}$.

The echo copy 642 is based on the baseband signals 606, 608 that are later upconverted to I and Q signals. In the illustrated embodiment, after mixing 650, 652, the mixed baseband signals are unscaled echo copies, which are scaled for gain by attenuation K 656, 658 to generate echo copies of the correct magnitude, and are then summed 636, 638 for echo cancellation. The attenuation K 656, 658 can be provided by an attenuator implemented with resistor dividers. To adjust the attenuation K, different valued resistors can be selected. The order can be interchanged so that in an alternative embodiment, the attenuation K 656, 658 can be performed first and the mixing 650, 652 performed afterwards. Preferably, each of the gain scaling K stages 656, 658, are independently adjusted by the OOC RSSI 660.

As illustrated in FIG. 6, the echo copy is canceled at the mixer output, which is an analog baseband signal. This reduces the complexity of the cancellation. This is made possible by taking advantage of the fact that the low noise amplifier (LNA) 620 can be made highly linear and that most of the nonlinearity appears at the mixer output 632, 634. Since the mixer output now has a reduced echo, the linearity requirements of the mixer and subsequent analog baseband circuits can be reduced.

Slicers 662 perform 1-bit analog-to-digital conversions for calculations of run lengths. An out-of-channel received signal strength indicator and control (OOC RSSI) 660 can be used to control the delay of the adjustable delay circuit 630 and the attenuation K 656, 658. The control 660, 664, 666 can be based on either electronic hardware or software/firmware executed by a processor, or by a combination of both hardware and software. The adjustable delay circuit 630 can be implemented in a variety of ways, for example, by a delay line with a selectable tap, by a phase shifting circuit using a varactor diode, or an adjustable active or passive filter, and the like. Typically, the OOC RSSI 660 generates a digital output for control of the adjustable delay circuit 630 or the attenuation K 656, 658. However, an analog control signal via a digital to analog converter can also be used.

The OOC RSSI 660 can correspond to the interference scanner described in co-owned U.S. patent application Ser. No. 12/055,948, filed Mar. 26, 2008, titled "Adaptive Interference Cancellation" by Tony Zortea and Matthew McAdam, the disclosure of which is incorporated by reference in its entirety. Portions of co-owned U.S. patent application Ser. No. 12/055,948 are also described in connection with FIGS. 7-11 herein. The OOC RSSI 660 can be used to sense and minimize the residual echo since the echo appears to be an out-of-channel (OOC) interferer to the receiver.

As described in U.S. patent application Ser. No. 12/055,948, the interference scanner (OOC RSSI 660 herein) analyzes the run-lengths of a sign of the down-converted (mixer output) signal to assess the frequency and strength of an interferer, as described later in connection with FIG. 11. The leakage echo appears to the interference scanner as interference. As applied to echo cancellation, the frequency of the leakage echo will be known and fixed. However, the strength of the leakage echo will vary depending on the phase and magnitude of the echo copy that is canceling the leakage echo.

In the illustrated embodiment, both the delay and the gain of the echo copy can be controlled by the OOC RSSI 660. Typically, the set of gain and delay combinations selectable by the OOC RSSI is finite. In one embodiment, using a "survival of the fittest" calibration mode in which all possible combination gains and delays for the OOC RSSI are tested using run lengths (counts of consecutive ones or zeroes), and the {gain,delay} set with the smallest echo or interference, as determined by the OOC RSSI 660 is chosen for use during normal operation.

Figure 16:
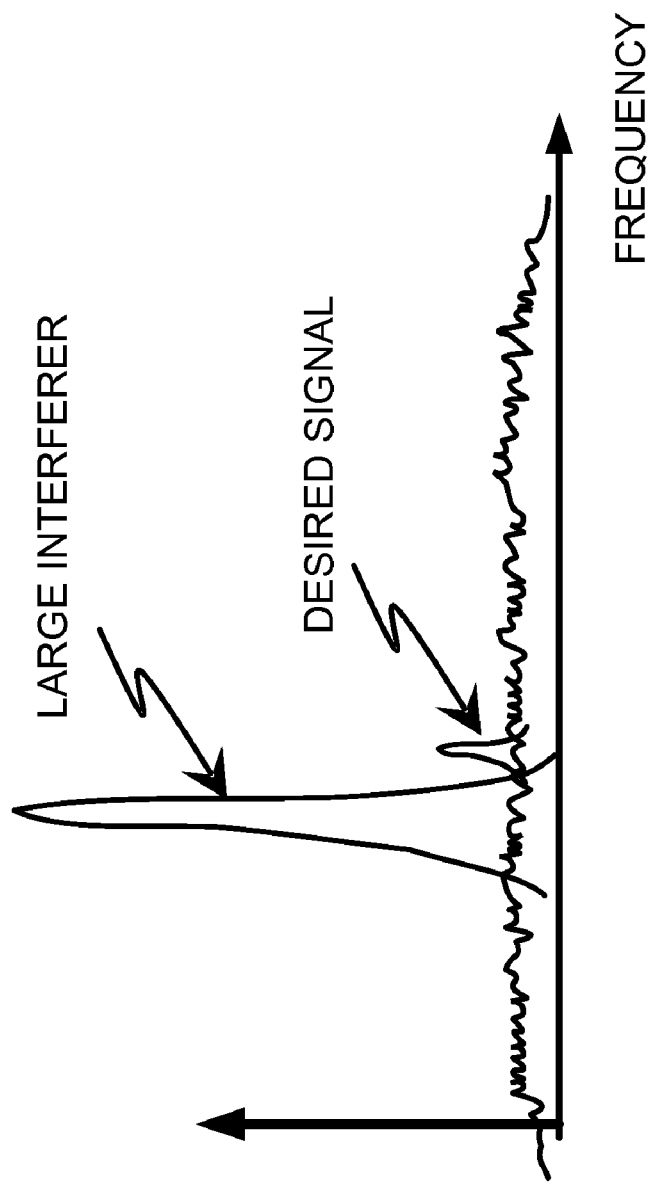
FIG. 16 illustrates an example of a spectrum of a received signal.
Figure 17:
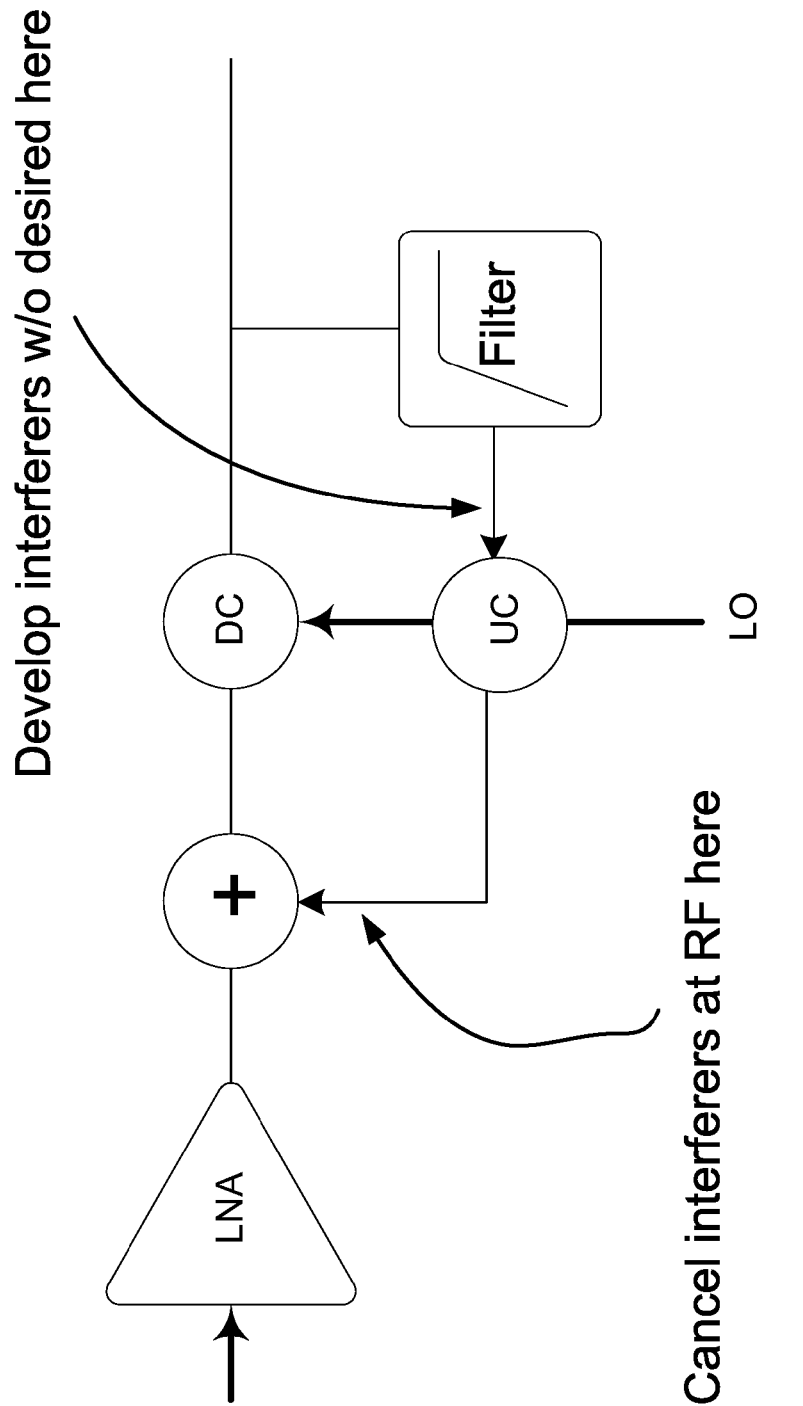
FIG. 17 illustrates an example of a prior art system.

To adequately receive the desired signal in the presence of a large interferer as shown in FIG. 16, a designer is typically faced with one of two choices: (1) increase the linearity and baseband filtering requirements of the radio; or (2) notch out the interferer earlier in the chain, at radio frequency, and relax the linearity and baseband filtering requirements of the radio. Choice 1 is a typical conventional approach.

Choice 2 uses a relatively high precision center frequency and a relatively high Q notch filter. For example, the desired and interfering signals may be separated by as little as a few MHz. An example of a ratio of carrier frequency to center frequency or filter transition band is expressed in Equation 1B.

$$\frac{F_{separation}}{F_{carrier}} = \frac{5 \text{ MHz}}{3.5 \text{ GHz}} \approx 0.1\% \qquad \text{Equation 2}$$

Equation 1B illustrates that the ratio of filter frequencies to carrier frequency is relatively small. The high-Q nature of the filter may be managed using a resonating tank circuit, but the center frequency precision will typically be controlled with an active control loop. An applicable high-Q filter will be readily determined by one of ordinary skill in the art.

Figure 18:
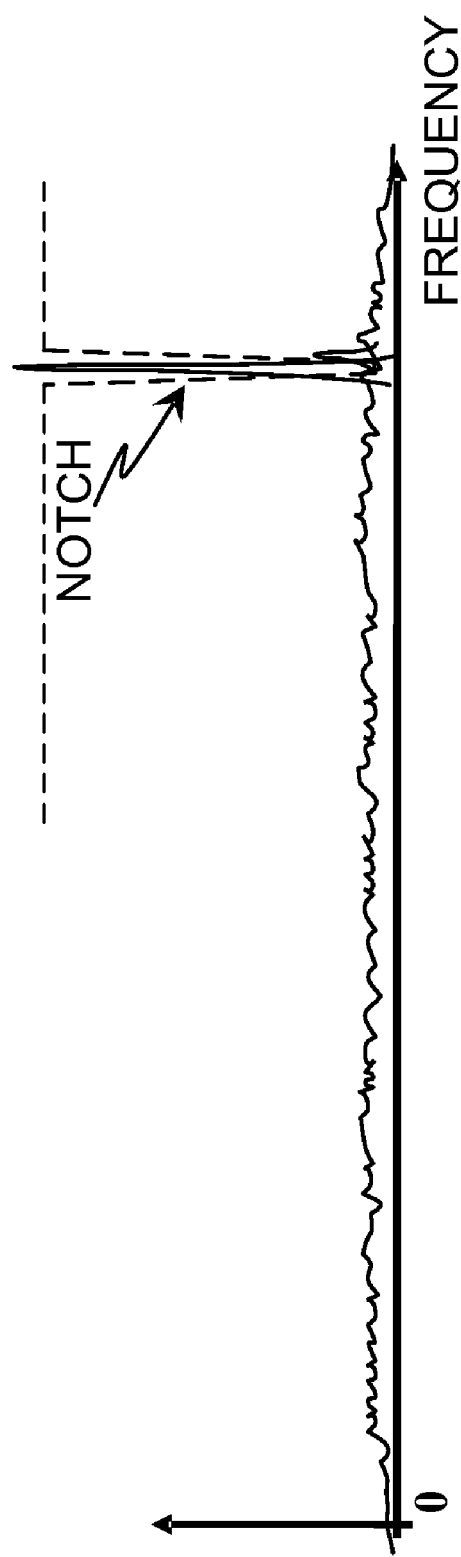
FIG. 18 illustrates signals and a notch.

FIG. 18 illustrates signals and a notch, with the chart extending to DC (0 frequency). The interferer location and strength can be assessed by an interference scanner, which will described in further detail later. In one embodiment, the effectiveness of notch filtering is assessed by the interference scanner.

Typically, the active control loop of the high-Q filter will use an estimate of the center frequency of the interferer. Techniques to estimate the center frequency will now be described.

Figure 7:
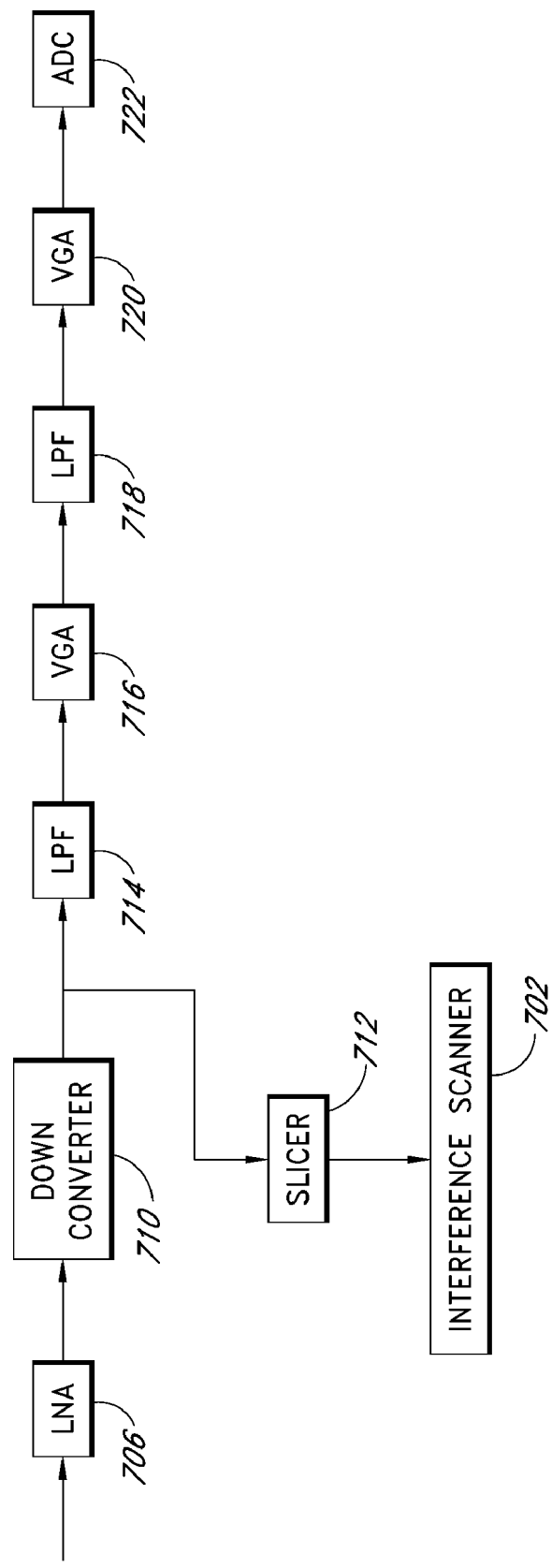
FIG. 7 illustrates a top-level architecture a front-end of a receiver using an interference scanner in an adaptive interference cancellation block.

FIG. 7 illustrates a top-level architecture a front-end of a receiver using an interference scanner 702. The interference scanner 702 can be used for the OOC RSSI 660 (FIG. 6). Note that interferers at RF appear as high frequency signals at baseband, as shown in FIG. 8.

RF signals, including the desired signal and one or more interferers, are received by a low-noise amplifier (LNA) 706. The RF signals from the LNA 706 are converted to baseband by a down converter 710.

An output of the down converter 710 is provided to a slicer 712 and to other components 714, 716, 718, 720, 722 of the receiver front-end. In the illustrated embodiment, the slicer 712 samples the output of the down converter 710 and determines whether the output is positive or negative. For example, the slicer 712 can generate hard symbols of zero or one from the output of the down converter 710. The output of the slicer 712 is provided to the interference scanner 702. The interference scanner 702 will be described later in greater detail. The other components 714, 716, 718, 720, 722 can be arranged in a variety of ways, including, but not limited to, conventional ways.

Figure 8:
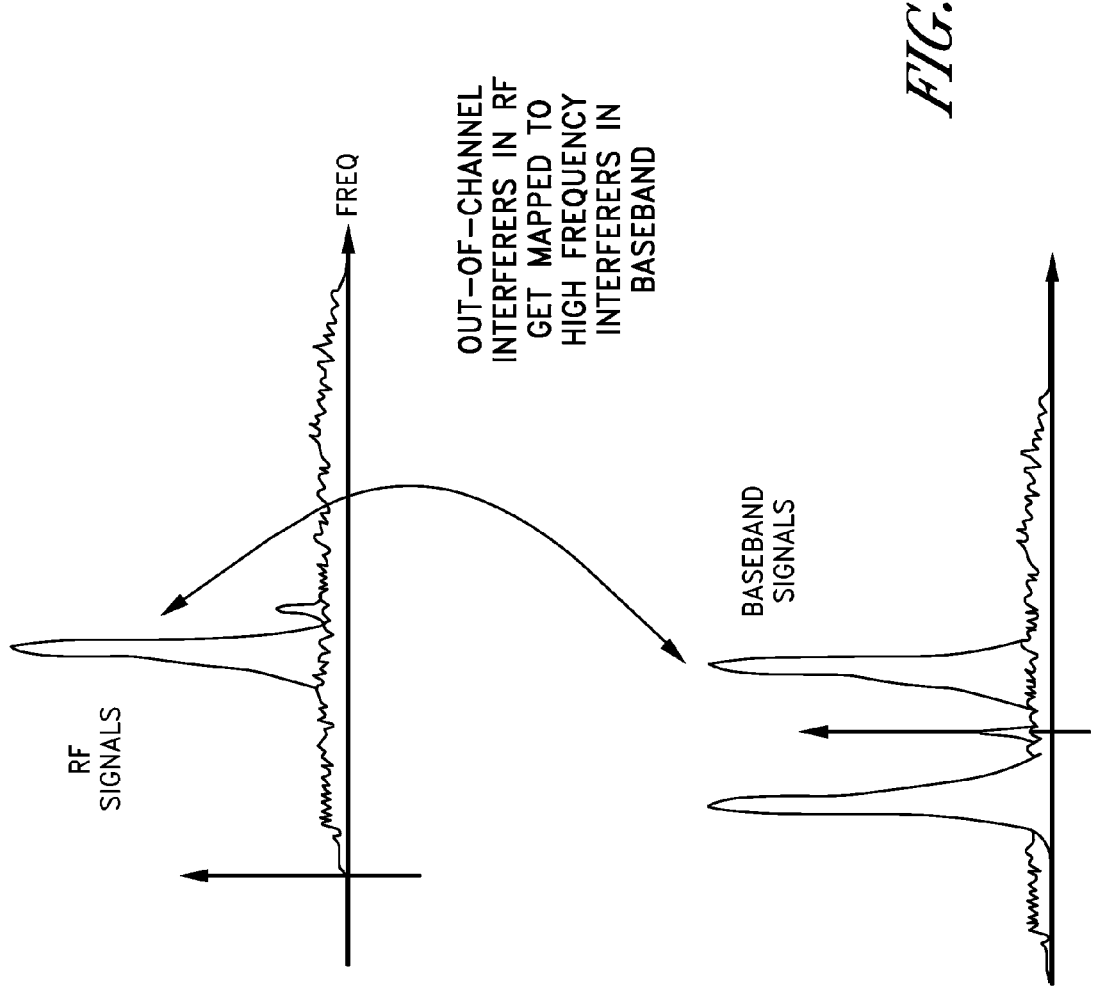
FIG. 8 illustrates an interferer originally in RF and mapped to baseband.

With reference to FIG. 8, interferers appear as high-frequency baseband signals. The probability of a zero-crossing per unit time from the output of the slicer 712 (FIG. 7) increases as the strength and frequency of the interferer increases. The output of the slicer 712 (FIG. 7) can be used to determine the zero-crossing of the down-converted signal; therefore shorter runs of ones or zeroes should be expected as the frequency of the interferer increases. For example, counters can be used to count the length of runs of ones or zeroes from the output of the slicer 712 (FIG. 7).

Figure 9:
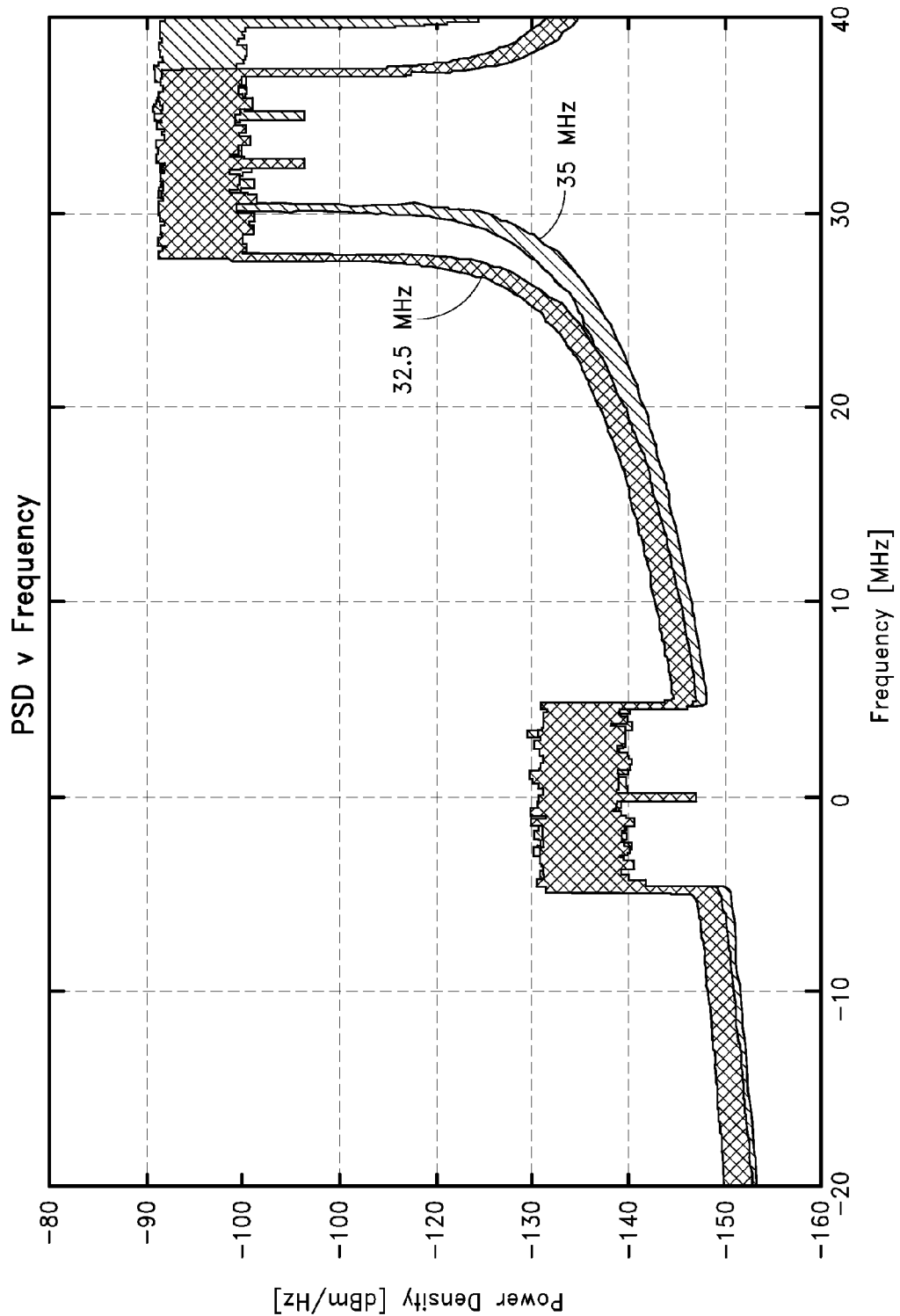
FIG. 9 is an overlay of two spectra with interferers in slightly different locations (32.5 MHz and 35 MHz frequency offsets).

Consider two cases: one in which an interferer is 3.25*BWdes away from the desired signal, and another in which an interferer is 3.5*BWdes away, wherein BWdes is the bandwidth of the desired signal. For this example, the bandwidth BWdes=10 MHz, so the interferers are at 32.5 MHz and 35 MHz frequency offsets. The spectra of the two cases are shown in FIG. 9.

Figure 10:
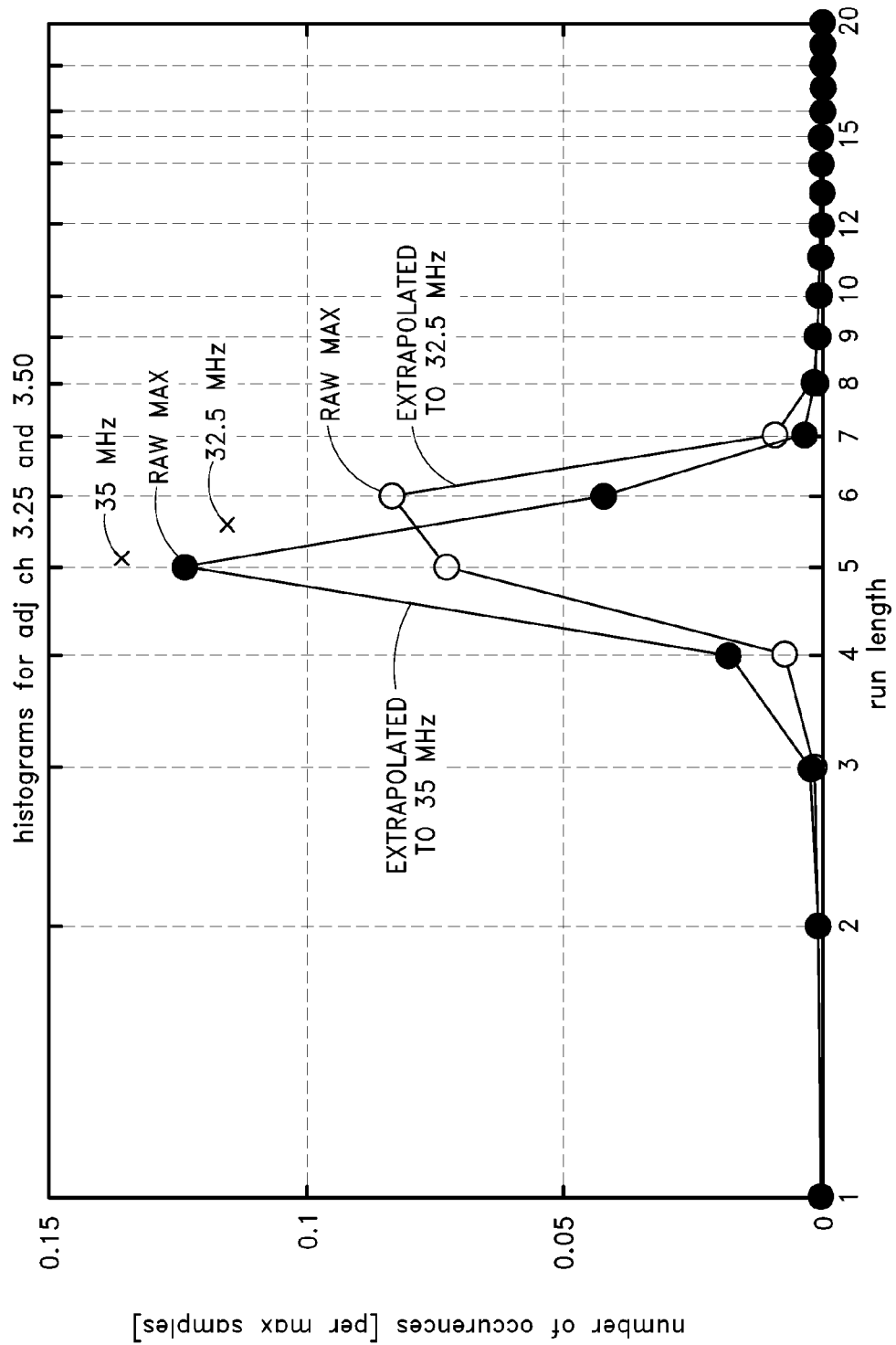
FIG. 10 is an overlay of two histograms of run-lengths of slicer output for two different interferer signals.

A histogram of run-lengths from the output of the slicer 712 (FIG. 7) for these two cases (32.5 and 35) are overlaid and shown in FIG. 10. The histogram represents frequency of occurrence distribution of run-lengths encountered. Note that the peak occurrence run-length falls at run-length 5 for the interferer at 35 MHz frequency offset, and at run length 6 for the interferer at 32.5 MHz frequency offset. To clarify, peak occurrence run-length means the run-length value with the highest frequency of occurrence in the frequency distribution and not the maximum length of the runs of zeroes and/or ones encountered.

This data represented in the histogram raises 2 questions: (1) what is the relationship of run-length to interferer center frequency; and (2) run-lengths are discrete counts (natural number counts), but the interferer center frequency can be any frequency.

In one embodiment, equation 2 is used to convert a run-length to a signal frequency.

$$F_{runlength} = \frac{F_{samp}/2}{RL} \quad \text{Equation 2}$$

Figure 11:
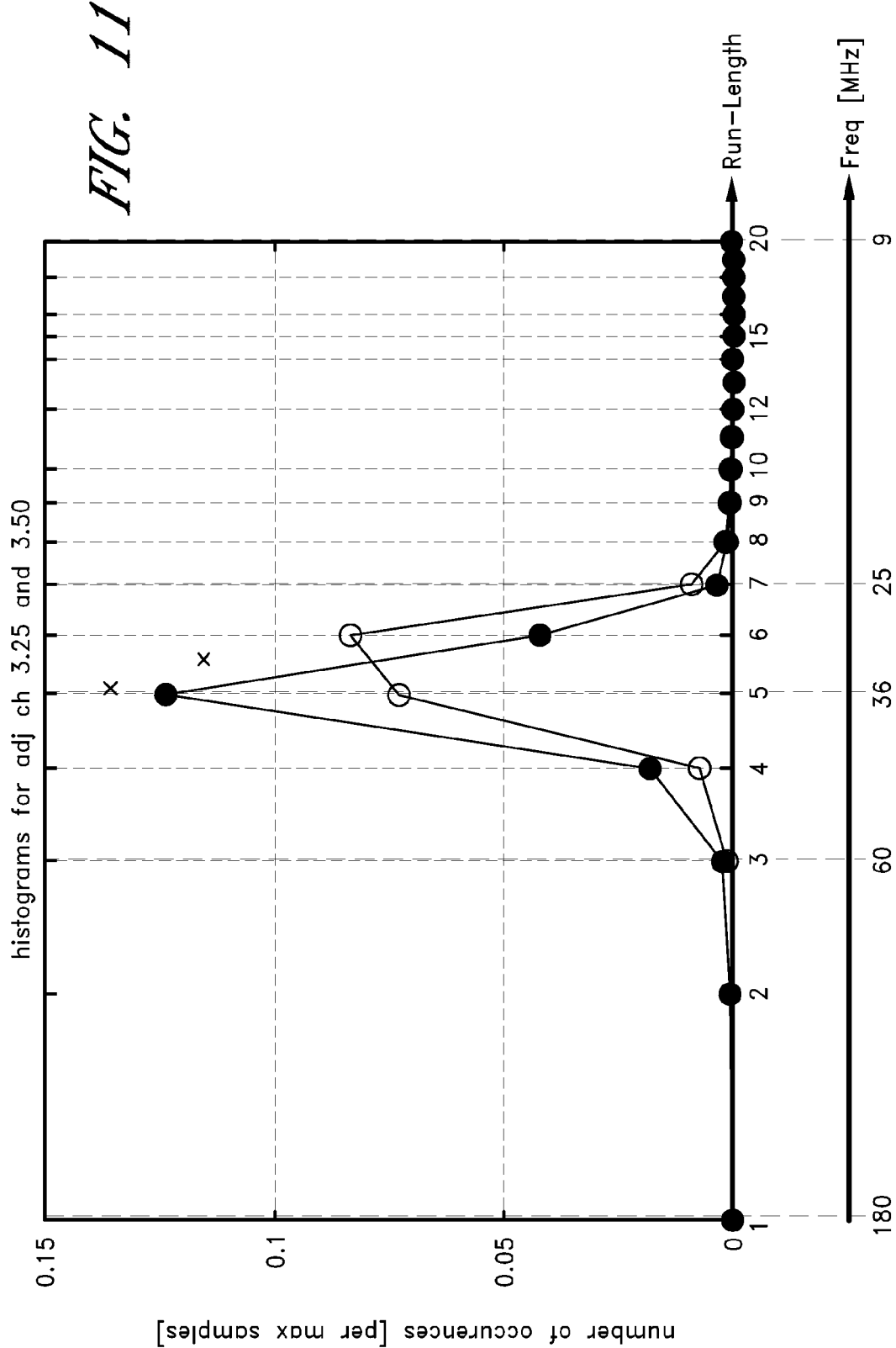
FIG. 11 illustrates a relationship of run-length to frequency.

In Equation 2, $F_{runlength}$ is the frequency of the interferer, $F_{samp}$ is the sampling frequency of the slicer 712 (FIG. 7), and RL is the count of the run length (count of consecutive ones or consecutive zeroes). Using Equation 2, the run-length axis can be associated with frequency, as shown in FIG. 11. The run-length (x-axis value) with the peak frequency of occurrence can be used to estimate a frequency of the interfering signal. Alternatively or in addition to the foregoing, an estimate of a signal strength of the interfering signal relative to a signal strength of the desired signal can be determined by examination of the value of the peak frequency of occurrence (y-axis). The estimated interfering signal strength can be used to determine whether to activate an interference filter, to assess the effectiveness of a particular interference filter configuration, to determine whether to adjust or tune an interference filter, or the like.

The run-lengths RL are of course discrete counts. For example, there cannot be a peak run length of 5.3 counts. The peak run length will be a discrete count, such as 5 or 6 counts in the illustrated example. However, data other than just the peak run length can also be used to evaluate a frequency of the interferer or a magnitude of the interferer. This other data is represented by the shape of the histogram. For example, points that are near the maximum frequency of occurrence run length can be used to estimate where the peak occurrence for run-length would have fallen if there had been a continuous run-length axis or a finer resolution count (faster sampling rate), that is, a non-natural number peak run-length. Techniques can also estimate where on the y-axis the maximum run-length would have fallen.

In the illustrate embodiment, the following Matlab® function can be used to estimate the continuous coordinates of the run-length with the maximum number of occurrences.

```
function [xmax,ymax] = findPeak(rls,fsamp);
%-- estimates the continuous co-ordinates of the maximum run-length
%-- and converts the maximum run-length to frequency
%-- inputs:
%-- rls == histogram of run-lengths
%-- fsamp == slicer sampling frequency
%-- outputs:
%-- xmax == maximum run-length, converted to frequency of
maximum interferer
%-- ymax == number of occurrences of maximum run-length
%-- get max rl and neighbors
mp = find(rls==max(rls));
if (mp==1 | mp==length(r1s));
    xmax = fsamp/2/mp;
    ymax = max(rls);
else
    vec = rls(mp-1:1:mp+1);
    xn = mp-1; yn=vec(1);
    xp = mp; yp=vec(2);
    xb = mp+1; yb=vec(3);
    if (vec(1)<=vec(3))
        xpeak = (xn*yb - xp*yb + xb*yn + xp*yn - xb*yp -
        xn*yp)/(2*yn - 2*yp);
        ymax = (xpeak-xn)*(yp-yn)/(xp-xn) + yn;
    else
        xpeak = (xn*yb + xp*yb + xb*yn - xp*yn - xb*yp -
        xn*yp)/(2*yb - 2*yp);
        ymax = (xpeak-xb)*(yb-yp)/(xb-xp) + yb;
    end;
    xmax = fsamp/2/xpeak;
end;
```

The above algorithm performs a linear extrapolation around the "raw" or discrete max to estimate an extrapolated max value. While the term extrapolation is used, the estimated data is within the run-length of the data (x-axis), but is outside the domain of the counted frequency of occurrence data (y-axis). The illustrated Matlab® function assumes that the peak is shaped like a simple "triangle" near the raw maximum (discrete count maximum). Visually, the algorithm can be observed in the graph of FIG. 7 by extrapolating the lines near the maximum of the two curves. The extrapolated data is represented by two "x" marks on the graph. The extrapolated peak is calculated to lie on a line that is formed by the raw maximum point and the nearest neighbor point that is farthest away from it, such as the adjacent point that has the lower count.

For example, the points with run lengths 6 (maximum) and 7 (adjacent with lower count) are used for the curve that is extrapolated to a 32.5 MHz peak. For example, the points with run lengths 4 (maximum) and 5 (adjacent with lower count) are used for the curve that is extrapolated to a 35 MHz peak. The extrapolated peak is determined to be located at the intersection of said line and another line formed by negating the slope (changing the sign of the slope) of said line and passing said line through the nearest neighbor point that is closest to the maximum, such as the other adjacent point (point at run length 5 for the 32.5 MHz peak and the point at run length 6 for the 35 MHz peak). The foregoing illustrates that the extrapolated x-axis value (non-natural number run length) can be used to estimate a frequency of the interfering signal.

In addition, alternatively or in addition to the foregoing, an estimate of a signal strength of the interfering signal relative to a signal strength of the desired signal can be determined by examination of the magnitude of the extrapolated peak (y-axis). The estimated interfering signal strength can be used to determine whether to activate an interference filter, to assess the effectiveness of a particular interference filter configuration, to determine whether to adjust or tune an interference filter, or the like.

The foregoing algorithm can be implemented via hardware, firmware, software, or by a combination of the foregoing. For example, a microprocessor, microcontroller, or other processor can be used to assess the interferer frequency. Using such techniques, such as the foregoing algorithm, the coordinates of the peak of the interferer, which for the example of FIG. 10, is shown below in FIG. 11. The frequency for the interferer as mapped in baseband versus run length count is expressed along a second horizontal axis of FIG. 11. A frequency associated with a local oscillator for the downconverter can be used to remap the baseband frequency of the interferer back to radio frequency. In many systems, the frequency of the local oscillator can change depending on the channel that is desired to be received. The interferer frequency at radio frequency can be the local oscillator frequency plus or minus the interferer frequency assessed at baseband.

The analysis of the run-lengths of the sign (positive or negative) of a signal can be used as a crude estimate of the spectrum of arbitrary signals, after the run-lengths are converted to frequencies, according to Equation 2. This analysis, illustrated with the aid of the histogram, should be limited to spectra with relatively few dominant peaks.

In FDD radios, the Tx center frequency is offset from the Rx center frequency by an amount $f_{separation}$ as expressed in Equation 3. The Rx center frequency can be higher or lower than the Tx center frequency, $$f_{separation} = |f_{rx} - f_{tx}|  \qquad \text{Equation 3}$$

Figure 12:
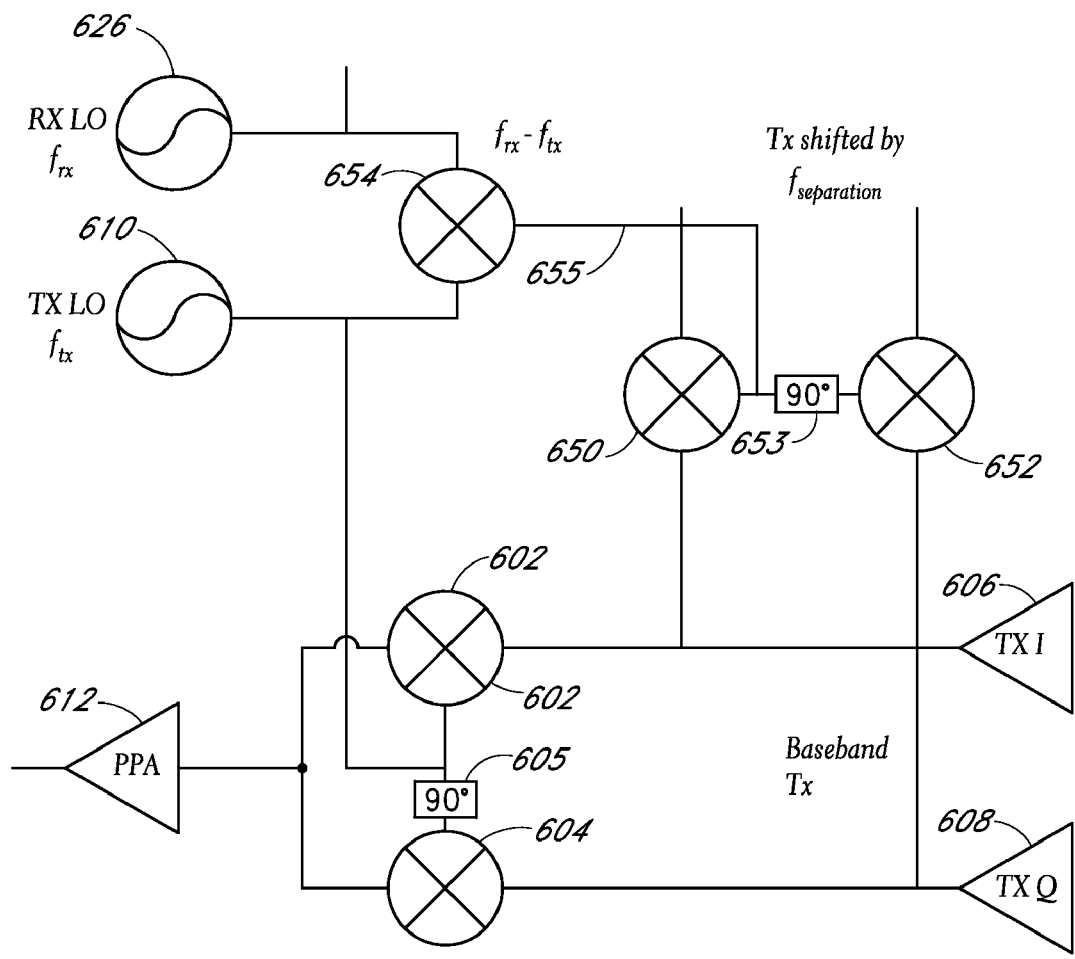
FIG. 12 illustrates the generation of a transmit copy by frequency shifting the baseband Tx signal.

To perform the echo summation in Rx analog baseband, the Tx baseband should be shifted by the separation frequency $f_{separation}$ as illustrated in FIG. 12. The same elements appearing in FIGS. 6 and 12 are designated by the same reference number.

Figure 13:
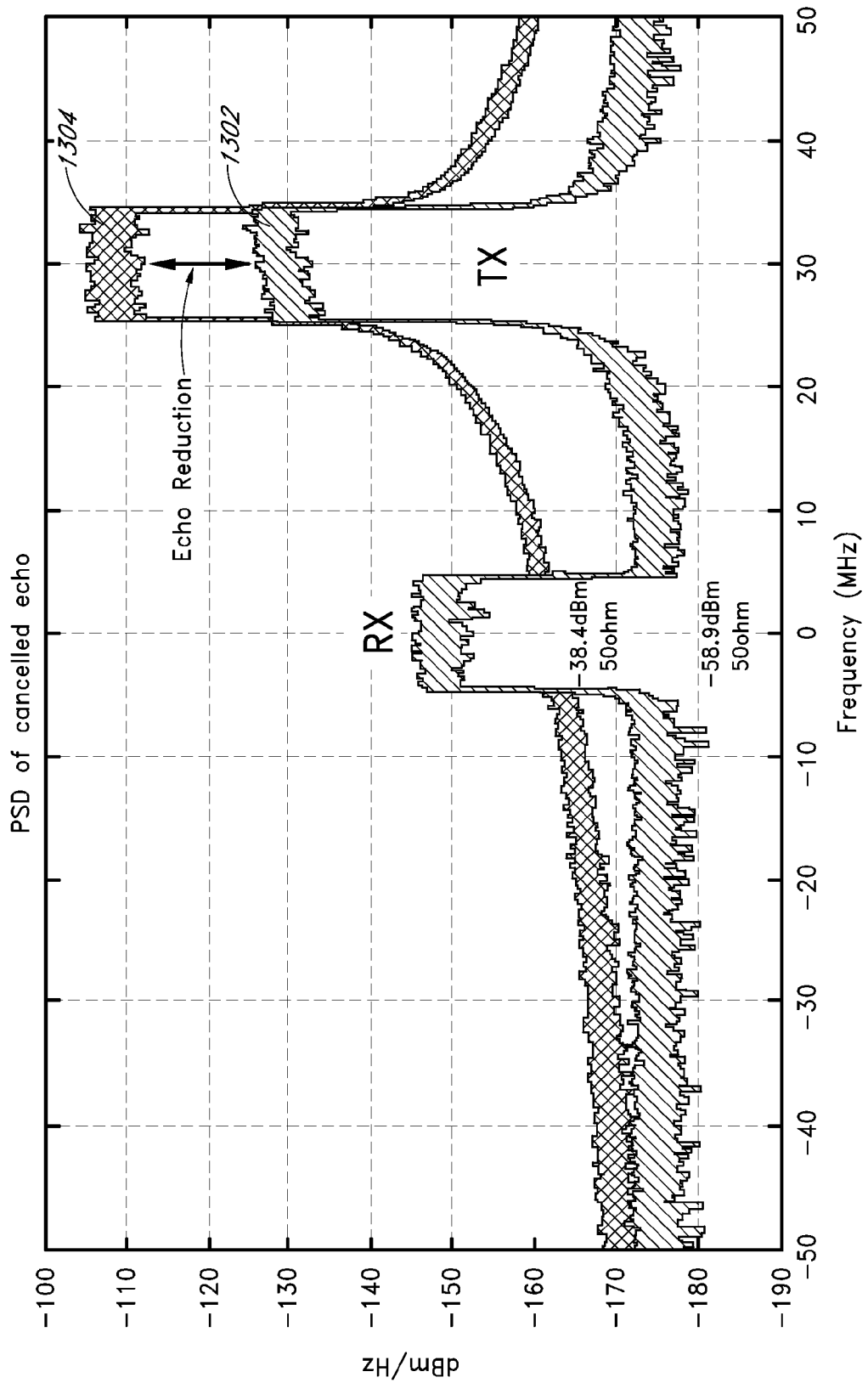
FIG. 13 is a simulated example of power spectral density (PSD) of an embodiment of the invention.

FIG. 13 illustrates a simulated example of power spectral density (PSD) of an embodiment of the invention. Magnitude in decibels is expressed along the vertical axis. Frequency is expressed along the horizontal axis. A curve 1302 illustrates the PSD without echo cancellation. A curve 1304 illustrates the PSD with the echo cancellation of the embodiment illustrated in connection with FIG. 6.

FIG. 14 illustrates a transceiver with echo cancellation according to an alternative embodiment. The same elements appearing in FIGS. 6 and 14 are designated by the same reference number. In the illustrated embodiment, a delay 1402, 1404 is inserted in the echo path for alignment of the echo copy 640, 642 with the leakage. The delay 1402, 1404 is controlled by a OOC RSSI 1406, similar to the OOC RSSI 660 (FIG. 6), except that it controls 1408 the delay 1402, 1404 in addition to or alternative to the adjustable delay circuit 630 of FIG. 6.

FIG. 15 illustrates a transceiver with echo cancellation according to an alternative embodiment. The transceiver has a transmitter portion 1502 and a receiver portion 1504. The duplexer 616 and the antenna 618 are shared by the transceiver. In one embodiment, the elements within a dashed box 1506 are integrated into a single integrated circuit.

In the illustrated embodiment, the echo from both the transmitter-side I(t) and Q(t) baseband signals 606, 608 is canceled from both the receiver-side I(t) and Q(t) baseband signals 644, 646. The same elements appearing in FIGS. 6 and 15 are designated by the same reference number. In comparison to the embodiment illustrated in FIG. 6, the embodiment of FIG. 15 adds cross-coupling to account for phase rotation in the Tx baseband echo relative to the Tx baseband 606 and 608.

An echo copy 1512 and an echo copy 1514 should be complementary to the leakage echo of the transmitter-side I(t) and Q(t) baseband signals 606, 608, respectively, such than when summed, the leakage echo is canceled (subtracted). The echo copy 1512 is summed with the receiver baseband I signal 632 to generate the modified receiver baseband I signal 644. The echo copy 1514 is summed with the receiver baseband Q signal 634 to generate the modified receiver baseband Q signal 646.

In the illustrated embodiment, the echo copy 1512 for the receiver I channel is generated by scaling K 1522, via, for example, an attenuator, the transmitter baseband I signal 606, by scaling K 1524 the transmitter baseband Q signal 608, by summing 1532 the results of scaling to generate a sum signal (output of the summer 1532), and by mixing 1542 the sum signal with a first phase of the separation frequency signal (output of the separation mixer 654). In the illustrated embodiment, the echo copy 1514 for the receiver Q channel is generated by scaling K 1526 the transmitter baseband I signal 606, by scaling K 1528 the transmitter baseband Q signal 608, by summing 1534 the results of scaling to generate a second sum signal, and by mixing 1544 the second sum signal with a second phase of the separation frequency signal.

The second phase is 90 degrees phase shifted 653 relative to the first phase. The phase shift is relative to a cycle of the separation frequency $f_{separation}$. The mixers 1542, 1544 provide frequency shifting by $f_{separation}$. The out-of-channel received signal strength indicator and control (OOC RSSI) 1510 is similar to the OOC RSSI 660 discussed earlier in connection with FIG. 6 and adjusts the adjustable delay circuit 630 and the gain of the gain scaling K stages 1522, 1524, 1526, 1528 for relatively good echo cancelation through adjustment paths 1513, 1514.

Preferably, each of the gain scaling K stages 1522, 1524, 1526, 1528 are independently adjusted by the OOC RSSI 1510. The independent adjustment permits complex rotation and compensation of imbalances of various mixers 602, 604, 622, 624.

Various alternative embodiments may occur to those of ordinary skill in the art. For example, instead of or in addition to the adjustable delay circuit 630, there can be an adjustable delay along the echo path to compensate for the longer path of the leakage echo. In another embodiment, instead of or in addition to the adjustable delay circuit 630, there can be delay in the path from the separation mixer 654 to the mixers 1542, 1544 to adjust the rotation of the echo copy, rather than the rotation of the leakage echo. In other alternative embodiments, the order of modulation, gain adjustment, and/or delay adjustment in the echo cancellation paths can vary.

In one embodiment, all the illustrated components are on a single integrated circuit except the local oscillators 610, 626, the power amplifier 614, the duplexer 616, the antenna 618, and the low noise amplifier 620.

Reducing Tx echo greatly eases the linearity requirements of the radio receiver, and of the duplexer (off chip), both of which can significantly decrease power, size and cost of the radio.

The following description and claims may refer to elements or features as being "connected" or "coupled" together. As used herein, unless expressly stated otherwise, "connected" means that one element/feature is directly or indirectly connected to another element/feature, and not necessarily mechanically. Likewise, unless expressly stated otherwise, "coupled" means that one element/feature is directly or indirectly coupled to another element/feature, and not necessarily mechanically. Thus, although the various schematics shown in the figures depict example arrangements of elements and components, additional intervening elements, devices, features, or components may be present in an actual embodiment (assuming that the functionality of the depicted circuits are not adversely affected).

Various embodiments have been described above. Although described with reference to these specific embodiments, the descriptions are intended to be illustrative and are not intended to be limiting. Various modifications and applications may occur to those skilled in the art.

What is claimed is:

1. A method of canceling echo in a frequency division duplex (FDD) radio, the method comprising:
   receiving a transmitter in-phase baseband signal and a transmitter quadrature-phase baseband signal to be upconverted and transmitted by a transmitter of the FDD radio in quadrature amplitude modulation using a transmitter local oscillator (Tx LO) signal;
   mixing a transmitter local oscillator (Tx LO) signal and a receiver local oscillator (Rx LO) signal to generate a separation frequency signal having a frequency corresponding to a difference in frequency between the Tx LO signal and the Rx LO signal;
   upconverting in quadrature the transmitter in-phase baseband signal and the transmitter quadrature-phase baseband signal using a first phase and a second phase, respectively, of the Tx LO to generate a transmitter QAM signal, wherein upconverting is performed by a transmitter of the FDD radio;
   receiving a receiver QAM signal, wherein receiving is performed by a receiver of the FDD radio;
   downconverting the receiver QAM signal in quadrature using a first phase and a second phase of the Rx LO signal to generate a receiver in-phase baseband signal and a receiver quadrature-phase baseband signal, respectively;
   generating a first echo copy signal wherein the first echo copy signal comprises a first product of mixing of the transmitter in-phase baseband signal and a first phase of the separation frequency signal;
   generating a second echo copy signal wherein the second echo copy signal comprises a second product of mixing of the transmitter quadrature-phase baseband signal and a second phase of the separation frequency signal;
   summing the receiver in-phase baseband signal with one of the first echo copy or the second echo copy to generate a modified receiver in-phase baseband signal;
   summing the receiver quadrature-phase baseband signal with the second echo copy or the first echo copy to generate a modified receiver quadrature-phase baseband signal;
   slicing at least one of the modified receiver in-phase baseband signal or the modified receiver quadrature-phase baseband signal to generate ones and zeros;
   assessing effectiveness of echo cancellation by analysis of run lengths of ones or zeros;
   delaying at least one signal of a first group or a second group, wherein the first group comprises at least one phase from the Rx LO signal used for upconversion, and wherein the second group comprises the first echo copy and the second echo copy;
   scaling the first echo copy signal and the second echo copy signal; and
   adjusting delaying and scaling based at least partly on the assessment of echo cancellation by analysis of run lengths such that the modified receiver in-phase baseband signal and the modified receiver quadrature-phase baseband signal have at least partially canceled echo.

2. The method of claim 1, wherein the method is embodied in an integrated circuit of the FDD radio, and wherein a power amplifier, an antenna shared by the transmitter and the receiver of the FDD radio, a duplexer coupling the transmitter and receiver to the antenna, and a low noise amplifier of the FDD radio are outside of the integrated circuit.

3. The method of claim 1:
   wherein generating the first echo copy signal comprises mixing the transmitter in-phase baseband signal and the first phase of the separation frequency signal, and scaling after mixing; and
   wherein generating the second echo copy signal comprises mixing the transmitter quadrature-phase baseband signal and the second phase of the separation frequency signal, and scaling after mixing.

4. The method of claim 1, wherein:
   generating the first echo copy signal comprises scaling the transmitter in-phase baseband signal, and then mixing the scaled transmitter in-phase baseband signal and the first phase of the separation frequency signal after scaling; and
   generating the second echo copy signal comprises scaling the transmitter quadrature-phase baseband signal, and then mixing the scaled transmitter quadrature-phase baseband signal and the second phase of the separation frequency signal after scaling.

5. The method of claim 1, wherein:
   generating the first echo copy signal further comprises:
      scaling the transmitter in-phase baseband signal to generate a first scaled transmitter in-phase baseband signal;
      scaling the transmitter quadrature-phase baseband signal to generate a first scaled transmitter quadrature-phase baseband signal;
      summing the scaled the transmitter in-phase baseband signal and the scaled transmitter quadrature-phase baseband signal to generate a first sum signal; and mixing the first sum signal and the first phase of the separation frequency signal to generate the first echo copy signal;

generating the second echo copy signal further comprises:
scaling the transmitter in-phase baseband signal to generate a second scaled transmitter in-phase baseband signal;
scaling the transmitter baseband Q signal to generate a second scaled transmitter quadrature-phase baseband signal;
summing the scaled the transmitter in-phase baseband signal and the scaled transmitter quadrature-phase baseband signal to generate a second sum signal; and
mixing the second sum signal and the second phase of the separation frequency signal to generate the second echo copy signal.

6. The method of claim 1, wherein assessing effectiveness of echo cancellation by analysis of run lengths of ones or zeros further comprises:
observing a plurality of consecutive ones or zeroes to tabulate run lengths of ones or zeroes, and collecting a frequency of occurrence distribution of the run-lengths observed; and
assessing an amount of echo cancellation based at least partly on the collected frequency of occurrence distribution.

7. The method of claim 1, wherein adjusting delaying and scaling further comprises:
analyzing each combination of gain and delay for echo cancellation effectiveness; and
selecting the particular combination of gain and delay for normal operation.

8. A method of canceling echo in a frequency division duplex (FDD) radio, the method comprising:
receiving a transmitter baseband signal to be upconverted using a transmitter local oscillator (Tx LO) signal and then transmitted by a transmitter of the FDD radio;
mixing a transmitter local oscillator (Tx LO) signal and a receiver local oscillator (Rx LO) signal to generate a separation frequency signal, wherein a frequency of the separation frequency corresponds to a difference in frequency between the Tx LO signal and the Rx LO signal;
receiving a receiver signal by a receiver of the FDD radio;
downconverting the receiver signal using the Rx LO signal to generate a receiver baseband signal;
generating an echo copy signal comprising at least a product of mixing of the transmitter baseband signal and the separation frequency signal;
summing the receiver baseband signal with the echo copy to generate a modified receiver baseband signal;
slicing the modified receiver baseband signal to generate ones and zeros;
assessing effectiveness of echo cancellation by analysis of run lengths of ones or zeros;
delaying at least one of the Rx LO signal or the echo copy;
scaling the echo copy signal; and
adjusting delaying and scaling based at least partly on the assessment of echo cancellation by analysis of run lengths such that the modified receiver baseband signal has at least partially canceled echo.

9. The method of claim 8, wherein the method is embodied is an integrated circuit of the FDD radio, and wherein a power amplifier, an antenna shared by the transmitter and the receiver of the FDD radio, a duplexer, and a low noise amplifier of the FDD radio are outside of the integrated circuit.

10. The method of claim 8, wherein generating the echo copy signal comprises mixing the transmitter baseband signal and the separation frequency signal and then scaling after mixing to generate the echo copy signal.

11. The method of claim 8, wherein generating the echo copy signal comprises scaling the transmitter baseband signal, and then mixing the scaled transmitter baseband signal and the separation frequency signal to generate the echo copy signal.

12. The method of claim 8, wherein assessing effectiveness of echo cancellation by analysis of run lengths of ones or zeros further comprises:
observing a plurality of consecutive ones or zeroes to tabulate run lengths of ones or zeroes, and collecting a frequency of occurrence distribution of the run-lengths observed; and
assessing an amount of echo cancellation based at least partly on the collected frequency of occurrence distribution.

13. The method of claim 12, wherein adjusting delaying and scaling further comprises:
analyzing each combination of gain and delay for echo cancellation effectiveness; and
selecting the particular combination of gain and delay for normal operation.

14. An apparatus for canceling echo in a frequency division duplex (FDD) radio, the apparatus comprising:
a mixer circuit configured to mix a transmitter local oscillator (Tx LO) signal and a receiver local oscillator (Rx LO) signal to generate a separation frequency signal, wherein a frequency of the separation frequency corresponds to a difference in frequency between the Tx LO signal and the Rx LO signal;
a downconverter configured to mix a receiver signal with the Rx LO signal to generate a receiver baseband signal;
an echo copy signal generator configured to generate an echo copy signal comprising at least a first product of mixing of a transmitter baseband signal and the separation frequency signal;
a delay circuit configured to delay at least one of the Rx LO signal or the echo copy;
an attenuator configured to adjust a magnitude of the echo copy signal;
a summing circuit configured to sum the receiver baseband signal with the echo copy to generate a modified receiver baseband signal;
a slicer configured to slice the modified receiver baseband signal to generate ones and zeros;
an out-of-channel received signal strength indicator and control (OOC RSSI) configured to assess the effectiveness of echo cancellation by analysis of run lengths of ones or zeros wherein the OOC RSSI is configured to adjust delay of the delay circuit and attenuation of the attenuator based at least partly on the assessment of echo cancellation by analysis of run lengths such that the modified receiver baseband signal has at least partially canceled echo.

15. The apparatus of claim 14, wherein the apparatus comprises an integrated circuit for the FDD radio, and wherein a power amplifier, an antenna shared by the transmitter and the receiver of the FDD radio, a duplexer, and a low noise amplifier of the FDD radio are outside of the integrated circuit.

16. The apparatus of claim 14, wherein the echo copy signal generator is configured to mix the transmitter baseband signal and the separation frequency signal, and then scale after mixing to generate the echo copy signal.

17. The apparatus of claim 14, wherein the echo copy signal generator is configured to scale the transmitter baseband signal, and then mix the scaled transmitter baseband signal and the separation frequency signal to generate the echo copy signal.

18. The apparatus of claim 14, wherein the OOC RSSI is further configured to:
   observe a plurality of consecutive ones or zeroes to tabulate run lengths of ones or zeroes, and collect a frequency of occurrence distribution of the run-lengths observed; and
   assess an amount of echo cancellation based at least partly on the collected frequency of occurrence distribution.

19. The apparatus of claim 18, wherein the OOC RSSI is further configured to:
   analyze each combination of gain and delay for echo cancellation effectiveness; and
   select the particular combination of gain and delay for normal operation.

20. The apparatus of claim 14, wherein the transmitter is configured to transmit in quadrature amplitude modulation (QAM) and the receiver signal is modulated in QAM:
   wherein the downconverter is configured to mix the receiver signal with a first phase of the Rx LO signal to generate an in-phase receiver baseband signal;
   further comprising a second downconverter configured to mix the receiver signal with a second phase of the Rx LO signal to generate a quadrature-phase receiver baseband signal;
   wherein the mixer circuit is configured to generate the separation frequency signal having at least a first phase and a second phase;
   wherein the echo copy signal generator is configured to generate the first product with the first phase of the separation frequency signal;
   wherein the echo copy signal generator is further configured to generate a second echo copy signal comprising at least a second product of mixing of a second transmitter baseband signal and the second phase of the separation frequency signal;
   wherein the delay circuit is configured to delay at least one of a phase of the Rx LO signal or to delay the echo copy and the second echo copy;
   further comprising a second attenuator configured to adjust a magnitude (664, 656, 658) of the second echo copy;
   further comprising a second summing circuit configured to sum the second receiver baseband signal with the second echo copy to generate a second modified receiver baseband signal;
   further comprising a second slicer configured to slice the second modified receiver baseband signal to generate ones and zeros; and
   wherein the out-of-channel received signal strength indicator and control (OOC RSSI) is further to adjust delay of the second delay circuit and attenuation of the second attenuator based at least partly on the assessment of echo cancellation by analysis of run lengths such that the modified receiver baseband signal and the second modified receiver baseband signal have at least partially canceled echo.

21. The apparatus of claim 20, wherein the echo copy signal generator further comprises:
   a first attenuator configured to scale the transmitter in-phase baseband signal to generate a first scaled transmitter in-phase baseband signal;
   a second attenuator configured to scale the transmitter quadrature-phase baseband signal to generate a first scaled transmitter quadrature-phase baseband signal;
   a third summing circuit configured to sum the scaled the transmitter in-phase baseband signal and the scaled transmitter quadrature-phase baseband signal to generate a first sum signal;
   a second mixer configured to mix the first sum signal and the first phase of the separation frequency signal to generate the first echo copy signal;
   a third attenuator configured to scale the transmitter in-phase baseband signal to generate a second scaled transmitter in-phase baseband signal;
   a fourth attenuator configured to scale the transmitter quadrature-phase baseband signal to generate a second scaled transmitter quadrature-phase baseband signal;
   a fourth summing circuit configured to sum the scaled the transmitter in-phase baseband signal and the scaled transmitter quadrature-phase baseband signal to generate a second sum signal; and
   a third mixer configured to mix the second sum signal and the second phase of the separation frequency signal to generate the second echo copy signal.

22. An apparatus for canceling echo in a frequency division duplex (FDD) radio, the apparatus comprising:
   a separation mixer configured to mix a transmitter local oscillator (Tx LO) signal and a receiver local oscillator (Rx LO) signal to generate a separation frequency signal, wherein a frequency of the separation frequency corresponds to a difference in frequency between the Tx LO signal and the Rx LO signal;
   a downconverter configured to downconvert a receiver signal using the Rx LO signal to generate a receiver baseband signal;
   means for generating an echo copy signal comprising at least a product of mixing of a transmitter baseband signal and the separation frequency signal;
   a summing circuit configured to sum the receiver baseband signal with the echo copy to generate a modified receiver baseband signal;
   a slicer configured to the modified receiver baseband signal to generate ones and zeros;
   means for assessing effectiveness of echo cancellation by analysis of run lengths of ones or zeros;
   a delay circuit configured to delay at least one of the Rx LO signal or the echo copy;
   an attenuator configured to scale the echo copy signal; and
   means for adjusting delay of the delay circuit and attenuation of the attenuator based at least partly on the assessment of echo cancellation by analysis of run lengths such that the modified receiver baseband signal has at least partially canceled echo.

* * * * *